Aug. 20, 1968     L. A. KILGORE ET AL     3,398,348
HIGH VOLTAGE ELECTRICAL CONVERTER APPARATUS
AND PULSE TRANSFORMER THEREFOR
Filed Sept. 8, 1965     2 Sheets-Sheet 1

WITNESSES:
Bernard R. Giguere
James F. Young

INVENTORS
Lee A. Kilgore, Harvey E. Spindle,
Louis A. Casanova & Thomas W. Dakin.
BY
Donald R. Lackey
ATTORNEY United States Patent Office 3,398,348
Patented Aug. 20, 1968

3,398,348
HIGH VOLTAGE ELECTRICAL CONVERTER APPARATUS AND PULSE TRANSFORMER THEREFOR
Lee A. Kilgore, Franklin Township, Export, Harvey E. Spindle and Louis A. Casanova, Pittsburgh, and Thomas W. Dakin, Murrysville, Pa., assignors to Westinghouse Electric Corporation, Pittsburgh, Pa., a corporation of Pennsylvania
Filed Sept. 8, 1965, Ser. No. 485,753
17 Claims. (Cl. 321—5)

ABSTRACT OF THE DISCLOSURE

A high voltage converter of the semiconductor type, having a pulse transformer arrangement which includes a single primary winding in the form of an insulated high voltage cable. A plurality of magnetic cores, each having a plurality of secondary windings, are disposed in spaced relation with one another about the high voltage cable, with the secondary windings being connected to the semiconductor devices of the converter. Pulse producing means is connected to the high voltage cable.

Figure 1:
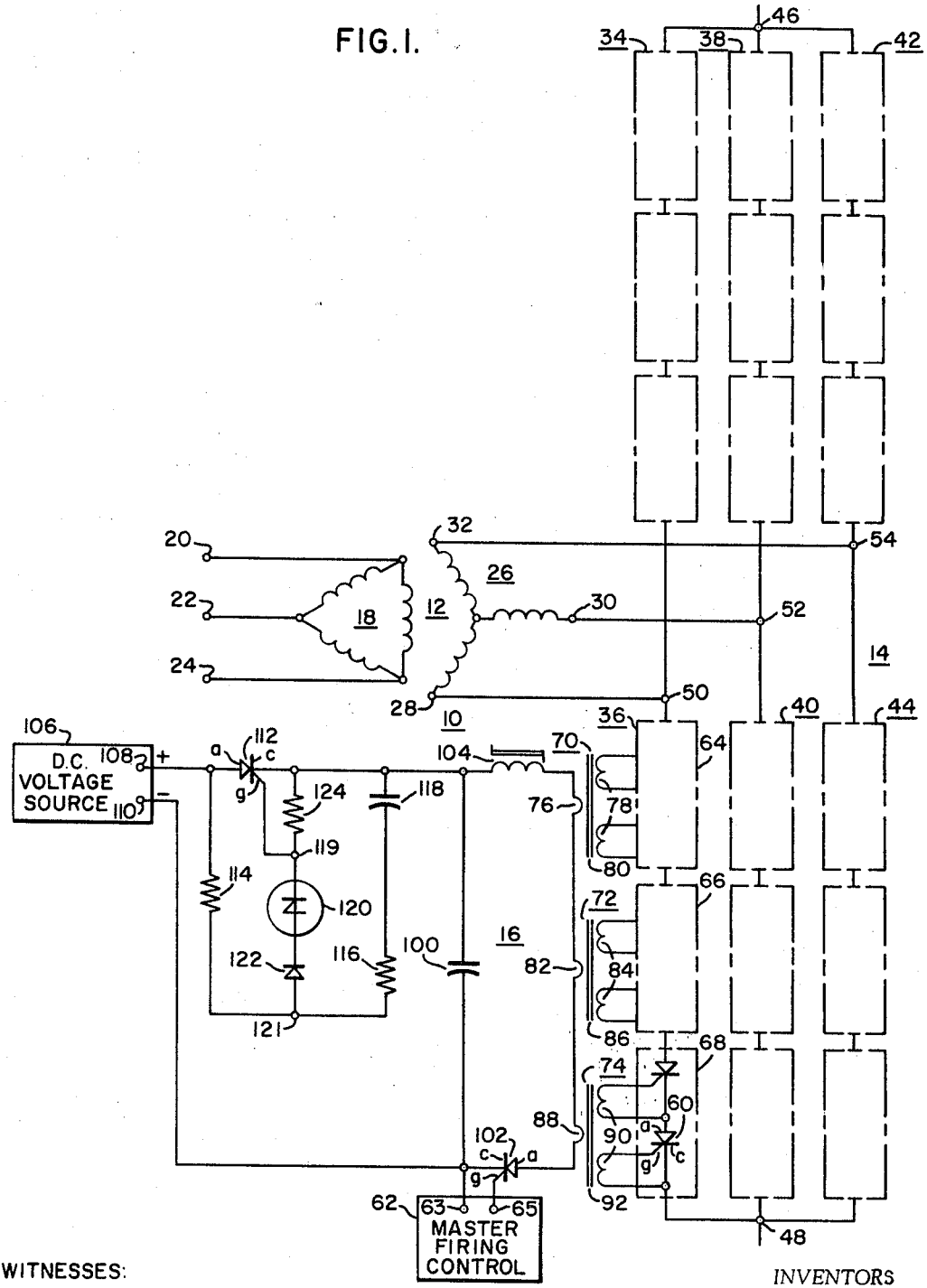

High voltage electrical converters, such as the type associated with D.C. transmission, require large pluralities of semiconductor devices to be serially connected. Many difficulties are experienced, however, when connecting large pluralities of semiconductor devices, such as silicon controlled rectifiers, in series circuit relation, which must be overcome in order to provide reliable apparatus having a cost within practical limits. For example, it is important to distribute steady state and transient voltages across the serially connected string of devices, in a substantially uniform manner, in order to insure that the maximum peak reverse blocking voltage (PRV) rating of the devices is not exceeded, and in order to keep from seriously derating the devices, which would adversely affect the cost of the apparatus. It is also important to control the rate of change of current in the devices. If the current increases at an excessive rate, the device may be destroyed, particularly when the devices are switched to their conductive state. Copending application, Ser. No. 485,743, filed Sept. 8, 1965, by L. A. Kilgore et al., and assigned to the same assignee as the present application, teaches protective and voltage distributing arrangements for serially connected semiconductor devices, which may be utilized to uniformly distribute steady state and transient voltages across a plurality of serially connected devices, and which controls the rate of change of current through the devices.

Additional difficulties arise in the mechanics of pulsing the gate or control electrodes of controllable serially connected devices. The gates must all be fired within a few microseconds of each other, the firing pulse must be controlled from ground potential, and the firing arrangement must not upset the substantially uniform steady state and transient voltage distributions across the devices.

In order to offset the stray capacitance of each device to ground, and provide a substantially uniform transient voltage distribution across the serially connected devices, a capacitor may be connected in shunt with each of the devices, to reduce the high frequency impedance of the devices along the series circuit. Additional stray capacitance to ground is introduced into the circuit, however, by the capacitance of the windings and leads of the pulse transformer. For example, thirty devices connected to separate secondary windings of a single pulse transformer, produce approximately a 5% higher voltage on the first device in the series string. Therefore, if more than approximately thirty semiconductor devices are connected to one pulse transformer, serious derating of the devices is required. If the serially connected string of devices is separated into a plurality of serially connected groups, with a pulse transformer for each group, the problem of simultaneously pulsing each group arises. The groups must not only be simultaneously pulsed, but the voltage distribution between groups must not be affected by the pulsing means. Further, conventional means for simultaneously pulsing each group would be impractical from a cost standpoint, due to the fact it would have to be electrically insulated for the voltage across all of the groups. The copending application hereinbefore referred to solves these problems by utilizing pulsing means at each group which is responsive to electromagnetic energy, with the electromagnetic energy being beamed or focused on each group from a master firing control. Thus, none of the components are subjected to the total voltage across all of the groups, and each group has its own pulse producing means which is arranged to insure that the pulse producing means will not affect the substantially uniform voltage distribution between groups.

It would also be desirable to be able to pulse each group simultaneously from a single pulse producing means, which pulse is distributed to the pulse transformer secondary windings of each group by electrically connected primary windings, if a construction could be provided which would withstand the voltage across all the groups and which would not be prohibitive from a cost standpoint. It would also be desirable to provide new and improved apparatus for providing the high current pulse required by the electrically connected primary windings.

Accordingly, it is an object of the invention to provide a new and improved high voltage electrical converter which utilizes serially connected semiconductor devices.

A further object of the invention is to provide a new and improved arrangement for mounting and connecting semi-conductor devices which aids in uniformly distributing electrical potentials across the devices.

Another object of the invention is to provide a new and improved high voltage converter having one or more strings of serially connected controllable semiconductor devices, in which each serially connected string is pulsed from a single pulse producing means.

A further object of the invention is to provide a new and improved pulse transformer arrangement for pulsing a plurality of serially connected controllable semiconductor devices, which utilizes a plurality of pulse transformers having electrically connected primary windings.

Still another object of the invention is to provide a new and improved pulse transformer arrangement for simultaneously pulsing a plurality of serially-connected controllable semiconductor devices, which has low stray capacitance to ground, is electrically connected to a single pulse producing means, and has an uncomplicated, rugged, reliable, corona free structure.

A further object of the invention is to provide a new and improved pulse producing arrangement for providing a pulse of current to the primary windings of pulse transformers.

Briefly, the present invention accomplishes the above cited objects by providing an electrical converter having a plurality of serially connected controllable semiconductor devices which are arranged into a plurality of groups having parallel planes and disposed about a common axis, a new and improved pulse transformer arrangement, and a new and improved single pulse producing means. The pulse transformer arrangement comprises a primary conductor, in the form of a high voltage cable, insulated for the voltage across the serially connected string of controllable semiconductor devices it is to serve. The serially connected semiconductor devices are arranged into a predetermined number of serially connected groups, and the magnetic cores for the groups are disposed to surround the primary conductor, in predetermined space relation with one another. The secondary windings for the controllable semiconductor devices of each group are disposed in inductive relation with each magnetic core, and connected in circuit relation with the control electrodes of the controllable semiconductor devices. The semiconductor devices of each group are disposed on a plane which is perpendicular to the primary conductor and the groups are electrically connected. Coating means having predetermined voltage dependent resistivity characteristics, are disposed in predetermined locations on the outer surface of the primary conductor, with the coating means including a plurality of coatings or paint having different resistivity characteristics. The plurality of coatings are disposed in a predetermined manner relative to the components of of the pulse transformer arrangement, in order to grade the direct current potential to ground, grade impulse voltages, grade the potential between groups, and provide contact surfaces for making good contact between shielding or stress grading means and other coatings, on the outer insulating surface of the primary conductor. The stress grading means may be conductive ring members disposed at predetermined locations on the structure.

The single pulse generating means, which applies a firing pulse to the primary conductor of the pulse transformers, in response to a signal from a master firing control, includes a capacitor which discharges through the primary conductor when a controlled rectifier is rendered conductive by the master firing control. A saturable reactor controls the rate of change of the pulse current, until the controlled rectifier has fully turned on. The recharging of the capacitor is delayed until the controlled rectifier has regained its blocking ability.

Further objects and advantages of the invention will become apparent as the following description proceeds and features of novelty which characterize the invention will be pointed out in particularity in the claims annexed to and forming a part of this specification.

Figure 2:
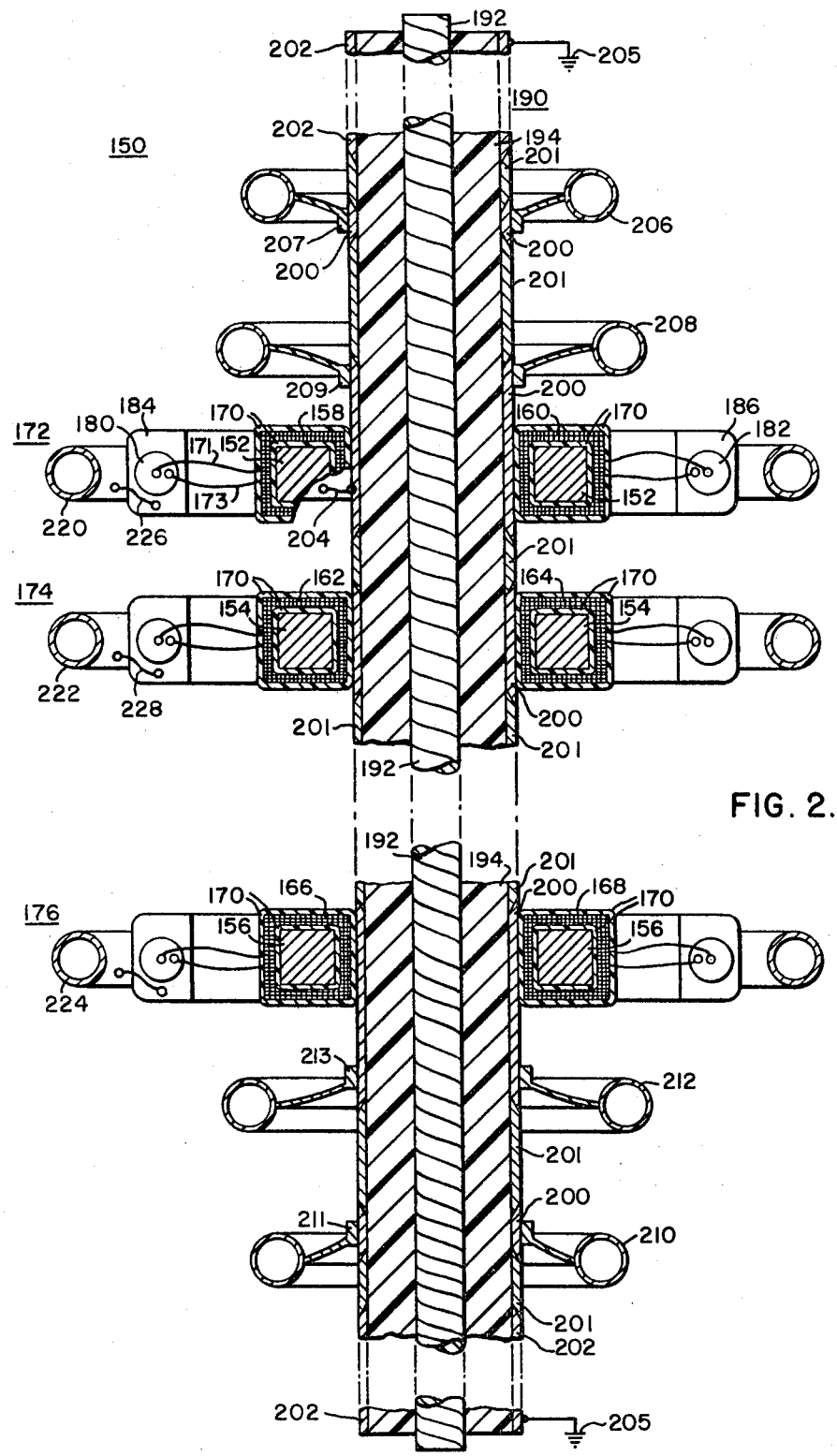

For a better understanding of the invention, reference may be had to the following detailed description, taken in connection with the accompanying drawings, in which:

FIGURE 1 is a schematic diagram illustrating an electrical converter and a pulse producing arrangement constructed according to an embodiment of the invention; and FIG. 2 is an elevational view, in section, of a pulse transformer constructed according to an embodiment of the invention.

Referring now to the drawings, and FIG. 1 in particular, there is shown an electrical converter 10 for changing one form of electrical energy into another form. Converter 10 includes transformer 12, three-phase bridge rectifier 14, and a pulse producing circuit arrangement 16. Transformer 12 includes a first winding 18 having alternating current terminals 20, 22 and 24, and a second winding 26, having alternating current terminals 28, 30, and 32. Bridge rectifier 14 includes a plurality of legs 34, 36, 38, 40, 42 and 44. Legs 34, 38 and 42 each have one end connected to direct current terminal 46, and their other ends connected to alternating current terminals 50, 52 and 54 respectively. Legs 36, 40 and 44 each have one end connected to direct current terminal 48, and their other ends connected to alternating current terminals 50, 52 and 54, respectively.

Winding 26 of transformer 12 has its alternating current terminals 28, 30 and 32 connected to alternating current terminals 50, 52 and 54, respectively, of bridge rectifier 14. Converter 10 may be a rectifier, in which case an alternating current potential (not shown) would be connected to alternating current terminals 20, 22 and 24 and a direct current load (not shown) would be connected to direct current terminals 46 and 48; or, it may be an inverter, with a direct current potential (not shown) being connected to direct current terminals 46 and 48, and an alternating current load being connected to alternating current terminals 20, 22 and 24.

Each of the legs 34, 36, 38, 40, 42 and 44 of bridge rectifier 14, includes a plurality of serially connected, controllable semiconductor devices, such as silicon controlled rectifier 60, shown in leg 36, which has anode, cathode and gate electrodes $a$, $c$, and $g$ respectively. In high voltage applications, such as D.C. transmission, each leg may have hundreds of serially connected controllable semiconductor devices, in order to obtain a voltage across each device which does not exceed its peak reverse blocking voltage (PRV).

For proper operation of bridge rectifier 14, the legs of the bridge are switched from blocking to conducting states according to a predetermined sequence, controlled by master firing control 62. Since master firing control arrangements are well known in the art, it is not necessary to describe them in detail.

Difficulties are experienced, however, when a large plurality of controllable semiconductor devices are connected in series circuit relation. If serious derating of the devices is to be prevented, the transient and steady state voltage distribution across the devices must be substantially uniform, the rate of change of current in the devices must be controlled when the devices are switched to their conductive state, and the devices in each leg must all be switched within a few microseconds of each other. The copending application hereinbefore referred to discloses arrangements which uniformly distribute transient and steady state voltages across the devices, controls the rate of change of current in the devices, and also discloses arrangements for firing the serially connected devices simultaneously. Because of the stray capacitance to ground associated with pulse transformers, only a limited number of devices may be controlled by one pulse transformer, if serious derating of the devices is to be prevented, and the copending application discloses dividing the serially connected devices into serially connected groups, with each group containing a plurality of serially connected controllable semiconductor devices which are controlled by a single pulse transformer. In order to avoid the problems of insulation and corona associated with a pulse arrangement which electrically connects all of the serially connected groups, the plurality of groups in the copending application are controlled by pulses of electromagnetic radiation, such as light or radio energy, produced by a master firing control. Thus, each group requires its own pulsing arrangement, which is electrically isolated from the other groups. This invention discloses a new arrangement for mounting the groups of serially connected devices which further aids in uniformly distributing voltages across the devices, and discloses a pulsing arrangement for a plurality of serially connected groups, in which the groups are electrically connected, with only one pulsing source thus being required for all of the serially connected groups in the leg.

More specifically, the controllable semiconductor devices in each leg have a plurality of serially connected groups of devices, with the number of devices in each group being determined by the stray capacitance of the pulse transformer serving the group, and the capacitance of the external shunt capacitor connected across each device. The formula:

$$E_N = E_n N \frac{C_P}{C_S} \coth N \frac{C_P}{C_S}$$

gives the voltage $E_N$ on the end device, where $E_n$ is the average voltage across the device, $C_P$ is the capacitance to ground of each device, and $C_S$ is the capacitance of the shunt capacitor connected to each device. Using a practical ratio of $C_S/C_P$, such as 5,000, it is found that thirty devices will give an excess voltage of 5% on the end device. Thus, it is convenient to divide the legs into a plurality of serially connected groups, such as represented by groups 64, 66 and 68 shown in leg 36, with each group having up to thirty serially connected devices. A pulse transformer is provided for each group, with each transformer having a separate secondary winding for each device in its associated group of semiconductor devices. The transformers should preferably have a construction which limits the stray capacitance of each secondary winding to approximately 100 micromicrofarads.

For example, group 64 would have a pulse transformer 70, group 66 would have a pulse transformer 72, and group 68 would have a pulse transformer 74. Pulse transformer 70 has a primary winding 76 and a plurality of secondary windings 78 disposed in inductive relation with magnetic core 80; pulse transformer 72 has a primary winding 82 and a plurality of secondary windings 84 disposed in inductive relation with the magnetic core 86; and, pulse transformer 74 has a primary winding 88 and a plurality of secondary windings 90 disposed in inductive relation with magnetic core 92. One of the secondary windings 90 of pulse transformer 74 is illustrated connected to the gate and cathode electrodes $g$ and $c$, respectively, of controlled semiconductor device 60, and it should be assumed that each pulse transformer has the same number of secondary windings as there are controllable semiconductor devices in the group it is to serve, and that the secondary windings are connected in circuit relation with the devices, such as shown in FIG. 1.

It will be noted that the primary windings 76, 82 and 88 are serially connected. A pulse transformer arrangement which allows the primary windings to be serially connected, and thus subjected to the voltage across all of the groups, will be hereinafter described in detail.

By connecting the primary windings 76, 82 and 88 serially, only one pulse means or source 16 is required for each leg. Since the pulse means 16 of pulse transformer arrangement is the same for each leg, only the pulse means 16 for leg 36 is shown.

In general, pulse forming means 16 comprises a capacitor 100, which is discharged through the primary windings 76, 82 and 88 when semiconductor switching means 102 is switched to its conductive state in response to a signal from master firing control 62, which has output terminals 63 and 65. Semiconductor switching means 102 may be a silicon controlled rectifier having anode, cathode and gate electrodes, $a$, $c$ and $g$, respectively. Master firing control 62 also controls the other legs of the bridge arrangement 14, from still other terminals (not shown). The current pulse from capacitor 100, discharging through primary windings 76, 82 and 88 when controlled rectifier 102 is rendered conductive, produces pulses in the plurality of secondary windings 78, 84 and 90, simultaneously, which pulses are applied to the plurality of controllable semiconductor devices in leg 36. Inductance means, such as reactor 104, may be connected in series circuit relation with the primary windings, in order to control the rate of rise of current through controlled rectifier 102 for a time sufficient to allow the junction of controlled rectifier 102 to be fully turned on. Reactor 104 may be of the saturating type, saturating after controlled rectifier 102 has had time to fully switch to its conductive condition.

Capacitor 100 is charged from a source of direct current potential, illustrated by block 106, which has positive and negative output terminals 108 and 110, respectively. It is the function of pulse forming circuit 16 to have capacitor 100 fully charged, to await a signal from master firing control 62, and it must not start to recharge until the pulse from capacitor 100 has decayed to the point where controlled rectifier 102 regains its blocking ability. This delay in recharging capacitor 100 is provided by semiconductor switching means 112, which may be a silicon controlled rectifier having anode, cathode and gate electrodes, $a$, $c$ and $g$, respectively, the circuit comprising resistors 114 and 116, and capacitor 118, and the Shockley diode 120. Controlled rectifier 112 has its anode $a$ connected to positive terminal 108 of source potential 106, and its cathode electrode $c$ connected to reactor 104 and capacitor 100. Resistors 114 and 116 and capacitor 118 are serially connected across the anode and cathode electrodes, $a$ and $c$, respectively, of controlled rectifier 112. The Shockley diode 120, which is a semiconductor device which will not conduct in its normally conductive direction until a predetermined potential is applied thereto, a conventional rectifier, such as a silicon diode 122, and a resistor 124, are connected from the junction 121 of resistors 114 and 116, to the cathode electrode $c$ of controlled rectifier 112. The gate electrode $g$ of controlled rectifier 112 is connected to the junction 119 of the Shockley diode 120 and resistor 124. Capacitor 100 is connected from the cathode electrode $c$ of controlled rectifier 112 to terminal 110 of source potential 106. Controlled rectifier 102 has its anode electrode $a$ connected to one end of the serially connected primary windings, and its cathode electrode $c$ connected to terminal 110 of source potential 106.

In the operation of pulse circuit 16, assume that capacitor 100 is fully charged, and controlled rectifiers 112 and 102 are in their blocking conditions. A firing signal is provided by master firing control 62 at terminals 63 and 65, which is applied to the cathode and gate electrodes, $c$ and $g$, respectively, of controlled rectifier 102, causing it to switch from its blocking to its conductive condition. Capacitor 100 will begin to discharge through reactor 104 and primary windings 76, 82 and 88 as controlled rectifier 102 switches, with reactor 104 controlling the rate of rise of anode current in controlled rectifier 102 until the junction of controlled rectifier 102 has been fully turned on. In order to delay the firing of controlled rectifier 112, and thus the recharging of capacitor 100, until controlled rectifier 102 has regained its blocking ability, capacitor 118 starts to charge when controlled rectifier 102 becomes conductive, with its charging path being through resistors 114 and 116, which control the charging rate of capacitor 118. When the voltage of capacitor 118 reaches a predetermined magnitude after a predetermined period of time, the voltage across rectifier 122 and the Shockley diode 120 become high enough to switch the Shockley diode 120 to its conductive condition. When the Shockley diode 120 conducts, a signal is applied to controlled rectifier 112, which switches it to its conductive condition, capacitor 118 discharges, and capacitor 100 is charged from source potential 106. When capacitor 100 is completely charged, controlled rectifier 112 will regain its blocking ability. Thus, we have capacitor 100 charged, and controlled rectifier 102 and 112 blocking, which is the condition assumed at the start of the cycle of operation.

The connection of the primary windings 76, 82 and 88 and the use of one pulse circuit for each leg, presumes a pulse transformer arrangement which will withstand the full voltage across the legs. Insulating conventional pulse transformers for the full leg voltage is prohibitive from a cost standpoint, when high voltages, such as those associated with D.C. transmission are considered, without even considering other problems such as the objectionably high stray capacitance such windings would have to ground, and the corona that would be produced around the windings.

The pulse transformer arrangement 150 shown in FIG. 2 makes the schematic arrangement of FIG. 1 practical. FIG. 2 is an elevational view, in section, of a pulse transformer arrangement 150 which has a stray capacitance from the secondary windings to ground within allowable limits, prevents corona, insulates the arrangement from the high leg voltages, and provides these advantages with an uncomplicated structure that may be easily and inexpensively constructed and which also aids in uniformly distributing transient voltages across serially connected semiconductor devices.

The pulse transformer arrangement 150 includes a plurality of ring shaped magnetic cores, such as magnetic cores 152, 154 and 156, with each magnetic core having a plurality of secondary windings disposed in inductive relation with the cores in an insulating manner. For example, magnetic core 152 has a plurality of secondary windings, such as windings 158 and 160, magnetic core 154 has a plurality of secondary windings, such as windings 162 and 164, and magnetic core 156 has a plurality of secondary windings 166 and 168. Insulating means 170 is disposed to insulate the plurality of secondary windings from their respective magnetic cores. Each of the magnetic cores 152, 154 and 156, and their associated secondary windings, serve a group of serially connected controllable semi-conductor devices, with the number of devices in each group being determined by the stray capacitance of the secondary windings to ground. A practical number of devices has been found to be in the range of 15 to 30. The devices in each group may be arranged in parallel tiers which have a common axis, such as tiers 172, 174 and 176, with the devices of each tier being disposed in a substantially circular manner. For example, tier 172 may have a plurality of serially connected controllable semiconductor devices, such as devices 180 and 182, disposed on suitable heat sink means 184 and 186, respectively. In addition to the devices of each tier being connected in series circuit relation, the group of devices which form each tier are also serially connected, with the complete arrangement of tiers forming a portion of an electrical converter, such as one leg of a bridge arrangement. The secondary windings are disposed at predetermined spaced intervals about their associated magnetic cores, and have leads connecting them with their associated controllable semiconductor devices, such as leads 171 and 173 from secondary windings 158 to device 180.

It should be noted that the arrangement of the semiconductor devices in a plurality of parallel tiers about a common axis provides a structure which substantially aids in uniformly distributing transient and direct voltages across a plurality of serially connected semiconductor devices, whether they are controllable, such as silicon controlled rectifiers, or conventional rectifiers, such as silicon diodes. For example, the distributed series inductance of the serially connected groups or tiers of devices may be reduced by connecting the tiers in a manner which reverses the current direction from tier to tier. Also, as will be hereinafter described, this arrangement facilitates shielding the devices in a manner which increases the capacitance between tiers and between devices in each tier.

Each of the magnetic cores 152, 154 and 156, which are ring shaped and have a circular opening therethrough, are served by serially connected primary windings, which are actually formed by a continuous high voltage cable 190, which has an electrical conductor 192 surrounded by electrical insulating means 194, such as polyethylene, and which has a sufficient length to withstand the voltage across its length. The cable 190 is threaded through the openings in the various magnetic cores 152, 154 and 156, with the magnetic cores having their openings in substantial registry and being spaced from one another on the cable 190 in a predetermined manner. The cable 190 is selected to withstand the maximum direct current voltage to ground which will exist across all of the tiers, plus the alternating current component. For example, a 400 kv.± D.C. transmission installation which has three rectifier bridges connected in series, would have an alternating current component of 65 kv. RMS. A polyethylene cable having an outside diameter of 3 inches and a ¾ or 1 inch conductor, would be adequate to withstand the radial stress of such an installation.

In addition to withstanding radial stress, it is essential that the transformer arrangement 150 prevent the formation of corona. Corona formation is prevented by the combination of a plurality of stress grading coating means 200, 201, 202, which preferably have voltage dependent resistivity characteristics, and stress grading members such as electrically conductive ring-like members 206, 208, 210, 212, 220, 222, and 224. Coating means 200, 201 and 202 may be in the form of a paint, which includes such materials as particulated silicon carbide held in a suitable binder, and formulated to provide predetermined voltage dependent resistivity characteristics.

Coating 200 has the lowest resistivity, in the order of 10,000 ohms per square, or less, at a gradient of 10 kv. per inch, and is utilized between each group or tier, such as tiers 172, 174 and 176, and the respective adjacent outer surface of cable insulating means 194, and between stress grading members 206, 208, 210, 212, 220, 222 and 224, and cable insulating means 194. Coating 200 provides the function of making good contact between stress grading members 206, 208, 210, 212, 220, 222, and 224, cable insulating means 194, and the other coating means.

Coating 201 has a resistivity in the range of 10 to 100 megohms per square at a gradient of 10 kv. per inch, and is utilized to provide stress grading between the tiers and provide impulse grading, such as for the high frequency switching transients produced when the controllable semiconductor devices switch "on" and "off." Coatings 200 and 201 should overlap slightly at their junctions to insure good contact between them.

Coating 202 has the highest resistivity of the coatings, in the order of 1000 megohms per square at 10 kv. per inch gradient, and is disposed on cable insulating means 194, extending outwardly away from the tiers in both directions, to substantially the ends of cable 190. Coating means 202 is grounded at each end of the cable 190, as shown at 205. Coating 202 provides the function of grading the DC voltage and its AC component between the transformer assembly and ground 205. Coatings 202 and 201 should overlap slightly at their junctions to insure good contact between them.

In addition to the coatings 200, 201 and 202, stress grading means such as rings 206 and 208 are disposed in spaced relation around the cable 190 at one end of the magnetic cores, and stress grading rings 210 and 212 are disposed in spaced relation around cable 190 at the other end of the magnetic cores. Stress grading rings 206, 208, 210 and 212 are connected to the coating 200, as shown at 207, 209, 211 and 213, respectively. The diameter of rings 206 and 208, and their location relative to one another, are predetermined to provide a capacitance between the rings and between the rings and cable conductor 192, which will divide the voltage between the rings in a substantially equal manner. The coatings 200, 201, and 202 control the gradients at the inner edges of the rings 206, 208, 210 and 212.

Instead of applying the semiconductor coatings 200, 201 and 202 as shown in FIG. 2, wherein the coatings overlap only at their junctions it would be equally effective to coat the whole outer surface of cable 190 with the higher resistivity coating, such as coating 202, and then apply the coating 201 continuously over coating 200 in the area adjacent the transformer cores, with coating 201 being applied intermediate the ends of the coating 202 to allow coating 202 to extend beyond coating 201 at both ends. Coating 200 would then be applied over coating 201 in the same locations shown in FIG. 2. Although it is preferable to utilize coatings 200, 201, and 202, which have a voltage dependent resistivity, it is to be understood that each coating may also be formed of several connected lengths of coatings having linear resistivity characteristics, with each of the lengths having a different resistivity and the resistivity of the coatings varying in predetermined steps. Also, in certain applications, coating 201 may be eliminated, in which case coating 202 would be disposed over substantially the complete length of cable 190, and coating 200 would be disposed as shown in FIG. 2.

The coatings and grading rings are essential in preventing corona at the ends of the strings of transformer cores, as without them almost the full peak inverse voltage could appear at one end of the cores, which would produce prohibitive corona in high voltage installations.

Additional stress grading or shielding means are disposed to surround each tier, such as grading rings 220, 222 and 224 disposed about tiers 172, 174 and 176, respectively. Stress grading rings 220, 222, and 224 prevent formation of corona on the various components of the tiers and aid in increasing the capacitance between the tiers and between the devices. The stress grading rings 220, 222 and 224 may be electrically connected to one of the controllable semiconductor devices in its associated tier, such as shown at 226, 228 and 230, or they may "float," and assume substantially the same potential as its associated tier, due to capacitive relationships. If connected to its associated tier, the connection may be made to the potential midpoint of the tier, or to any other predetermined point, depending upon the particular design. Also, in most applications, it will be desirable to connect the stress grading rings to the tiers to the coating 200 immediately adjacent the tier, as shown at 204 in tier 172.

Since a pulse forming network, such as the network 16 shown in FIG. 1, must be connected to both ends of conductor 192 in order to provide a pulse in each of the plurality of secondary windings, it may be convenient to shape the conductor 192 in the form of a U, and dispose magnetic cores on each leg of the U. In this manner, both connections to the transformer arrangement from the pulsing circuit will be closer together.

It is to be understood that FIG. 2 is functional only, with the various supporting means for supporting the stress grading rings and the plurality of tiers of controllable semiconductor devices not being shown for purposes of simplicity.

Thus, there has been disclosed a high voltage electrical converter which has a new and improved arrangement for mounting a plurality of semiconductor devices to aid in uniformly distributing voltages across the devices and has a new and improved pulse transformer arrangement for simultaneously pulsing a large plurality of controllable semiconductor devices. The pulse transformer arrangement includes a plurality of magnetic cores and a plurality of secondary windings associated therewith, and includes a primary winding in the form of a high voltage cable, which serves all of the magnetic cores and secondary windings. The pulse transformer arrangement utilizes a conventional high-voltage cable for the primary winding which has an arrangement of coatings thereon of material having predetermined voltage dependent resistivity characteristics, which cooperate with the stress grading rings to prevent stress concentrations of a magnitude which would cause corona. The cable, in effect, forms a plurality of serially connected primary windings for the plurality of magnetic cores, and thus requires only one pulsing source to simultaneously pulse all of the secondary windings with the plurality of magnetic cores. The disclosed pulse transformer arrangement thus solves the problem of simultaneously pulsing a large plurality of controlled rectifiers, and since it does so with a common pulse producing means, the voltage distribution between the serially connected groups is not affected when the groups are pulsed. Further, the transformer arrangement has an uncomplicated structure, which facilitates manufacture at a practical cost.

A new and improved pulse producing means has also been disclosed herein, which is suitable for use with the disclosed transformer arrangement; however, it will be understood that any suitable pulse producing means may be utilized with the pulse transformer arrangement disclosed herein. The disclosed pulse producing means is reliable, and forms the desired high current pulse for the plurality of pulse transformers with a minimum of components. The circuit is self protecting, limiting the rate of current rise in the semiconductor switching component until its junction is fully turned on, and it provides the necessary delay in recharging the storage capacitor after it has discharged through the primary windings of the pulse transformers.

Since numerous changes may be made in the above-described apparatus and different embodiments of the invention may be made without departing from the spirit thereof, it is intended that all matter contained in the foregoing description or shown in the accompanying drawings shall be interpreted as illustrative, and not in a limiting sense.

We claim as our invention:

1. A pulse transformer arrangement adapted for connection to a source of electrical energy, for providing control signals to a plurality of serially connected controllable semiconductor devices, comprising an electrical conductor of predetermined length having first and second ends, electrical insulating means disposed to surround said electrical conductor for at least a portion of its length, coating means having predetermined resistivity characteristics disposed to surround and contact said electrical insulating means for at least a portion of its length, magnetic core means disposed in inductive relation with said electrical conductor adjacent the portion of said electrical conductor having said coating means disposed thereon, a plurality of windings disposed in inductive relation with said magnetic core means, said plurality of windings being adapted for connection to the serially connected controllable semiconductor devices, the first and second ends of said electrical conductor being adapted for connection to the source of electrical energy.

2. A pulse transformer arrangement adapted for connection to a source of electrical energy for providing control signals to a plurality of serially connected controllable semiconductor devices, comprising an electrical conductor of predetermined length having first and second ends, electrical insulating means disposed to surround said electrical conductor for at least a portion of its length, coating means having predetermined resistivity characteristics disposed to surround and contact said electrical insulating means for at least a portion of its length, a plurality of magnetic cores disposed in inductive relation with said electrical conductor adjacent the portion of said electrical conductor having said coating means disposed thereon, a plurality of windings disposed in inductive relation with each of said magnetic cores, said plurality of windings being adapted for connection to the serially connected controllable semiconductor devices, the first and second ends of said electrical conductor being 3. A pulse transformer arrangement adapted for connection to a source of electrical energy for providing control signals to a plurality of serially connected controllable semiconductor devices, comprising an electrical conductor of predetermined length having first and second ends, electrical insulating means disposed to surround said electrical conductor for at least a portion of its length, coating means having a voltage dependent resistivity disposed to surround and contact said electrical insulating means for at least a portion of its length, a plurality of magnetic cores disposed in inductive relation with said electrical conductor, adjacent the portion of said electrical conductor having said coating means disposed thereon, a plurality of windings disposed in inductive relation with each of said magnetic cores, said plurality of windings being adapted for connection to the serially connected controllable semiconductor devices, voltage grading means disposed at each end of said plurality of magnetic cores, said first and second ends of said electrical conductor being adapted for connection to the source of electrical energy.

4. A pulse transformer arrangement adapted for connection to a source of electrical energy for providing control signals to a plurality of serially connected controllable semiconductor devices, comprising an electrical conductor of predetermined length having first and second ends, electrical insulating means disposed to surround said electrical conductor for at least a portion of its length, coating means having a voltage dependent resistivity disposed to surround and contact said electrical insulating means for at least a portion of its length, a plurality of magnetic cores disposed in inductive relation with said electrical conductor adjacent the portion of said electrical conductor having said coating means disposed thereon, a plurality of windings disposed in inductive relation with each of said magnetic cores, said plurality of windings being adapted for connection to the serially connected controllable semiconductor devices, voltage grading members disposed at each end of said plurality of magnetic cores and in contact with said coating means, voltage grading members disposed a predetermined distance from each of said plurality of magnetic cores, the first and second ends of said electrical conductor being adapted for connection to the source of electrical energy.

5. A pulse transformer arrangement for connection to a source of electrical energy for providing control signals to a plurality of serially connected controllable semiconductor devices, comprising an electrical conductor of predetermined length having first and second ends, electrical insulating means disposed to surround said electrical conductor for at least a portion of its length, first coating means having a first voltage dependent resistivity characteristic disposed to surround and contact said electrical insulating means at predetermined locations, second coating means having a second voltage dependent resistivity characteristic disposed to surround and contact said electrical insulating means in predetermined locations, a magnetic core disposed in inductive relation with said electrical conductor adjacent said second coating means, a plurality of windings disposed in inductive relation with said magnetic core, said plurality of windings being adapted for connection to the serially connected controllable semiconductor devices, first and second voltage grading means disposed a predetermined distance apart at each end of said magnetic core, said first and second voltage grading means being disposed in spaced relation with said second coating means and electrically connected thereto, additional voltage grading means disposed in spaced relation with said magnetic core, the first and second ends of said electrical conductor being adapted for connection to the source of electrical energy.

6. A pulse transformer arrangement for connection to a source of electrical energy for providing control signals to a plurality of serially connected controllable semiconductor devices, comprising an electrical conductor of predetermined length having first and second ends, electrical insulating means disposed to surround said electrical conductor for at least a portion of its length, first coating means having a first voltage dependent resistivity characteristic disposed to surround and contact said electrical insulating means at predetermined locations, second coating means having a second voltage dependent resistivity characteristic disposed to surround and contact said electrical insulating means in predetermined spaced locations, a plurality of magnetic cores disposed in predetermined spaced relation relative to one another and in inductive relation with said electrical conductor adjacent said second coating means, a plurality of windings disposed in inductive relation with each of said magnetic cores, said plurality of windings being adapted for connection to the serially connected controllable semiconductor devices, voltage grading means disposed adjacent the outer end of both the first and last of said spaced plurality of magnetic cores, said voltage grading means being disposed in spaced relation with said second coating means and electrically connected thereto, additional voltage grading means, said additional voltage grading means being disposed in spaced relation with said plurality of magnetic cores and electrically connected to said second coating means, the first and second ends of said electrical conductor being adapted for connection to the source of electrical energy.

7. A pulse transformer arrangement for connection to a source of electrical energy for providing control signals to a plurality of serially connected controllable semiconductor devices, comprising an electrical conductor of predetermined length having first and second ends, electrical insulating means disposed to surround said electrical conductor for at least a portion of its length, first, second and third coating means each having a predetermined voltage dependent resistivity characteristic disposed to surround and contact said electrical insulating means at predetermined locations, a plurality of magnetic cores disposed in predetermined spaced relation relative to one another and in inductive relation with said electrical conductor adjacent said second coating means, a plurality of windings disposed in inductive relation with each of said magnetic cores, said plurality of windings being adapted for connection to the serially connected controllable semiconductor devices, first and second voltage grading means disposed a predetermined distance apart adjacent the outer end of both the first and last of said spaced plurality of magnetic cores, said first and second voltage grading means being disposed in spaced relation with said second coating means, means connecting said first and second voltage grading means with said second coating means, said third coating means being disposed on said electrical insulating means between said magnetic cores, and between said first and second voltage grading means, said first coating means extending from the first and second ends of said electrical conductor to said third coating means, additional voltage grading means, said additional voltage grading means being disposed in spaced relation with each of said plurality of magnetic cores and electrically connected to said second coating means, the first and second ends of said electrical conductor being adapted for connection to the source of electrical energy.

8. An electrical converter comprising, an electrical conductor of predetermined length having first and second ends, electrical insulating means disposed to surround said electrical conductor for at least a portion of its length, coating means having predetermined resistivity characteristics disposed to surround and contact said electrical insulating means for at least a portion of its length, magnetic core means disposed in inductive relation with said electrical conductor adjacent the portion of said electrical conductor having said coating means disposed thereon, a plurality of windings disposed in inductive relation with said magnetic core means, a plurality of controllable semiconductor devices each having main electrodes and a control electrode, said plurality of controllable semiconductor devices having their main electrodes serially connected, each of said plurality of windings being connected in circuit relation with one of the control electrodes of said controllable semiconductor devices, and means for supplying a pulse of electrical energy connected to the first and second ends of said electrical conductor.

9. An electrical converter comprising an electrical conductor of predetermined length having first and second ends, electrical insulating means disposed to surround said electrical conductor for at least a portion of its length, coating means having voltage dependent resistivity characteristics disposed to surround and contact said electrical insulating means for at least a portion of its length, a plurality of magnetic cores disposed in inductive relation with said electrical conductor adjacent the portion of said electrical conductor having said coating means disposed thereon and spaced from one another, a plurality of windings disposed in inductive relation with each of said magnetic cores, a plurality of controllable semiconductor devices each having main electrodes and a control electrode, said plurality of controllable semiconductor devices having their main electrodes serially connected, said plurality of serially connected semiconductor devices being arranged into a plurality of serially connected groups corresponding to the number of said magnetic cores, each of said groups being disposed adjacent one of said magnetic cores, each of said plurality of windings associated with each of said magnetic cores being connected in circuit relation with one of the control electrodes of said controllable semiconductor devices in the adjacent group, means for supplying a pulse of electrical energy connected to the first and second ends of said electrical conductor, a plurality of voltage grading members, one of said voltage grading members being disposed in spaced relation with each of said groups of controllable semiconductor devices, at least one of said voltage grading members being disposed adjacent the first and last of said spaced magnetic cores in spaced relation with and electrically connected to said coating means.

10. An electrical converter comprising an electrical conductor of predetermined length having first and second ends, electrical insulating means disposed to surround said electrical conductor for at least a portion of its length, first coating means having a first voltage dependent resistivity characteristic disposed to surround and contact said electrical insulating means at predetermined locations, second coating means having a second voltage dependent resistivity characteristic disposed to surround and contact said electrical insulating means in predetermined locations, magnetic core means disposed to surround said electrical conductor adjacent said second coating means, a plurality of windings disposed in inductive relation with said magnetic core means, a plurality of controllable semiconductor devices each having main electrodes and a control electrode, said plurality of controllable semiconductor devices having their main electrodes serially connected, each of said plurality of windings being connected in circuit relation with one of the control electrodes of said controllable semiconductor devices, means for supplying a pulse of electrical energy connected to the first and second ends of said electrical conductor, first and second voltage grading means disposed a predetermined distance apart at each end of said magnetic core means, said first and second voltage grading means being disposed in spaced relation with said second coating means, additional voltage grading means, said additional voltage grading means being disposed in spaced relation with said controllable semiconductor devices.

11. An electrical converter comprising an electrical conductor of predetermined length having first and second ends, electrical insulating means disposed to surround said electrical conductor for at least a portion of its length, first coating means having a first voltage dependent resistivity characteristic disposed to surround and contact said electrical insulating means at predetermined locations for grading alternating and direct current potentials, second coating means having a second voltage dependent resistivity characteristic disposed to surround and contact said electrical insulating means at predetermined spaced locations, a plurality of magnetic cores disposed to surround said electrical conductor adjacent said second coating means, third coating means having a third voltage dependent resistivity characteristic disposed to surround and contact said electrical insulating means between said magnetic cores, a plurality of windings disposed in inductive relation with each of said magnetic cores, a plurality of controllable semiconductor devices each having main electrodes and a control electrode, said plurality of controllable semi-conductor devices having their main electrodes serially connected, said plurality of serially connected semiconductor devices being arranged into a plurality of serially connected groups corresponding to the number of said magnetic cores, each of said groups being disposed adjacent one of said magnetic cores, each of said plurality of windings associated with each of said magnetic cores being connected in circuit relation with one of the control electrodes of said controllable semiconductor devices in the adjacent group, means for supplying a pulse of electrical energy connected to the first and second ends of said electrical conductor, first and second voltage grading members disposed a predetermined distance apart at the outer end of both the first and last of said spaced plurality of magnetic cores, said first and second voltage grading members being disposed in spaced relation with said second coating means, means connecting said first and second voltage grading members with said second coating means, additional voltage grading members, said additional voltage grading members being disposed in spaced relation with each of said groups of controllable semiconductor devices.

12. An electrical converter comprising an electrical conductor of predetermined length having first and second ends, electrical insulating means disposed to surround said electrical conductor for at least a portion of its length, first coating means having a first voltage dependent resistivity characteristic disposed to surround and contact said electrical insulating means for a predetermined length, second coating means having a second voltage dependent resistivity characteristic disposed to surround and contact said first coating means intermediate its ends to allow predetermined lengths of said first coating means to extend beyond said second coating means, third coating means having a third voltage dependent resistivity characteristic disposed in spaced lengths over said second coating means, a plurality of magnetic cores disposed to surround said electrical conductor adjacent said third coating means to form a group of spaced magnetic cores having first and second ends, a plurality of windings disposed in inductive relation with each of said magnetic cores, a plurality of controllable semiconductor devices each having main electrodes and a control electrode, said plurality of controllable semiconductor devices having their main electrodes serially connected, said plurality of serially connected semiconductor devices being arranged into a plurality of serially connected groups corresponding to the number of said magnetic cores, each of said groups being disposed adjacent one of said magnetic cores, each of said plurality of windings associated with each of said magnetic cores being connected in circuit relation with one of the control electrodes of said controllable semiconductor devices in the adjacent group, means for supplying a pulse of electrical energy connected to the first and second ends of said electrical conductor, first and second voltage grading members disposed a predetermined distance apart at both the first and second ends of said group of spaced magnetic cores, said first and second voltage grading members being electrically connected to said third coating means, additional voltage grading members, one of said additional voltage grading members being disposed in spaced relation with each of said groups of controllable semiconductor devices and electrically connected to said third coating means.

13. An electrical circuit for producing pulses of electrical energy for simultaneously controlling a plurality of serially connected controllable semiconductor devices, comprising first means for providing a unidirectional electrical potential, second means connected in circuit relation with said first means for storing electrical energy from said first means, a plurality of pulse transformers having a common primary winding formed of a length of insulated high voltage cable and a plurality of magnetic cores each having a plurality of secondary windings disposed in inductive relation therewith, said plurality of magnetic cores being disposed about said high voltage cable in spaced relation with one another, third means for controlling rate of change of current, fourth means which switches from a blocking condition to a conductive condition in response to a control signal, fifth means connected in circuit relation with said fourth means for providing control signals, said second, third and fourth means and the common primary winding of said pulse transformers being connected serially, said second means discharging its stored energy through said third means and said common primary winding when a control signal from said fifth means is applied to said fourth means, and sixth means connected in circuit relation with said first and second means for providing a predetermined delay after said second means begins to discharge before said second means again stores energy from said first means.

14. An electrical circuit for producing pulses of electrical energy for controlling a plurality of serially connected controllable semiconductor devices, comprising a source of unidirectional potential having positive and negative output terminals, inductance means, first and second controlled rectifier means each having an anode, cathode and control electrodes, a plurality of pulse transformers each having a primary winding and a plurality of secondary windings, the primary windings of said pulse transformers being serially connected, first and second capacitance means, the anode electrode of said first controlled rectifier means being connected to the positive output terminal of said source potential, said first capacitance means being connected from the cathode electrode of said first controlled rectifier means to the negative output terminal of said source potential, said inductance means, the serially connected primary windings of said pulse transformers, and the anode-cathode electrodes of said second controlled rectifier means being serially connected across said first capacitance means with said second controlled rectifier means being poled to allow said first capacitance means to discharge through said primary windings when it switches to its conductive condition, firing control means connected in circuit relation with the control and cathode electrodes of said second controlled rectifier means, first, second and third resistance means, a semiconductor diode having the characteristic of switching from a blocking to a conductive condition in its normally conductive direction when a predetermined potential is applied thereto, said first and second resistance means and said second capacitance means being serially connected from the anode to the cathode electrodes of said first controlled rectifier means, with said second capacitance means being connected to the cathode electrode, said third resistance means and said semiconductor diode being connected from the junction of said first and second resistance means to the cathode of said first controlled rectifier means, the control electrode of said first controlled rectifier means being connected to the junction of said semiconductor diode and said third resistance means, said first capacitance means being charged from said source potential and discharged through said inductance means and said primary windings when said second controlled rectifier means is switched to its conductive condition by said firing control means, said inductance means controlling the rate of rise of current through said second controlled rectifier means, said second capacitance means charging through said first and second resistance means when said second controlled rectifier means become conductive, said semiconductor diode becoming conductive when the charge potential of said second capacitance means reaches a predetermined magnitude, to switch said first controlled rectifier to its conductive condition and charge said first capacitance means, said second capacitance means discharging when said first controlled rectifier becomes conductive, said first and second resistance means, said second capacitance means, and said semiconductor diode being selected to provide the desired delay between the time said first capacitance means begins to discharge and the time that said first capacitance means is recharged by said source potential.

15. Gate pulsing apparatus for simultaneously controlling a plurality of serially connected controllable semiconductor devices, comprising first means for providing a unidirectional electrical potential, second means connected in circuit relation with said first means for storing electrical energy from said first means, a pulse transformer arrangement including an electrical conductor of predetermined length having first and second ends, electrical insulating means disposed to surround said electrical conductor for at least a portion of its length, coating means having predetermined resistivity characteristics disposed to surround and contact said electrical insulating means for at least a portion of its length, a plurality of magnetic cores disposed in inductive relation with said electrical conductor, adjacent the portion of said electrical conductor having said coating means disposed thereon, a plurality of windings disposed in inductive relation with each of said magnetic cores, said plurality of windings being adapted for connection to the serially connected controllable semiconductor devices, third means which switches from a blocking condition to a conductive condition in response to a control signal, fourth means connected in circuit relation with said third means for providing control signals, said second and third means and said electrical conductor being connected serially, said second means discharging said stored energy through said electrical conductor when a control signal from said fourth means is applied to said third means, and fifth means connected in circuit relation with said first and second means for providing a predetermined delay after said second means begins to discharge before said second means again stores energy from said first means.

16. An electrical converter comprising first means for providing a unidirectional electrical potential, second means connected in circuit relation with said first means for storing electrical energy from said first means, a pulse transformer arrangement including an electrical conductor of predetermined length having first and second ends, electrical insulating means disposed to surround said electrical conductor for at least a portion of its length, a plurality of coating means each having predetermined voltage dependent resistivity characteristic disposed to surround and contact said electrical insulating means at predetermined locations, a plurality of magnetic cores disposed to surround said electrical conductor adjacent certain of said coating means, a plurality of windings disposed in inductive relation with each of said magnetic cores, a plurality of controllable semiconductor devices each having main electrodes and a control electrode, said plurality of controllable semiconductor devices having their main electrodes serially connected, said plurality of serially connected semiconductor devices being arranged into a plurality of serially connected groups corresponding to the number of said magnetic cores, each of said groups being disposed adjacent one of said magnetic cores, each of said plurality of windings associated with each of said magnetic cores being connected in circuit relation with one of the control electrodes of said controllable semiconductor devices in the adjacent group, first and second voltage grading means disposed a predetermined distance apart at each end of said spaced plurality of magnetic cores, said first and second voltage grading means being disposed in spaced relation with certain of said coating means, means connecting said first and second voltage grading means with certain of said coating means, additional voltage grading means, said additional voltage grading means being disposed in spaced relation with each of said groups of said controllable semiconductor devices, third means which switches from a blocking condition to a conductive condition in response to a control signal, fourth means connected in circuit relation with said third means for providing control signals, said second and third means and said electrical conductor being serially connected, said second means discharging its stored energy through said electrical conductor when a control signal from said fourth means is applied to said third means, and fifth means connected in circuit relation with said first and second means for providing a predetermined delay after said second means is discharged before said second means again stores energy from said first means.

17. An electrical converter comprising a plurality of controllable semiconductor devices, said semiconductor devices being arranged into a plurality of groups, the devices of each of said groups being serially connected and disposed in a common plane about an axis perpendicular to the common plane, said plurality of groups being disposed in spaced parallel relation with their axes in substantial alignment, said plurality of groups being serially connected, pulse transformer means for providing switching signals for said plurality of semiconductor devices, said pulse transformer means including a length of insulated electrical conductor disposed substantially along the axis perpendicular to the plane of each of said groups, means electrically connected to said electrical conductor for providing switching pulses, and a plurality of magnetic cores each having a plurality of windings thereon, said plurality of magnetic cores being disposed about said electrical conductor, each adjacent one of said plurality of groups, with each of the plurality of windings on said magnetic cores being electrically connected to one of the semiconductor devices in its associated group.

References Cited

UNITED STATES PATENTS

| | | | |
|---|---|---|---|
| 2,920,297 | 1/1960 | Spicer | 336—174 |
| 2,942,215 | 6/1960 | Bennon et al. | 336—70 |
| 2,984,773 | 5/1961 | Guldemond et al. | 317—234 |
| 3,173,061 | 3/1965 | Storsand | 317—100 |
| 3,234,451 | 2/1966 | Diebold | 321—8 |
| 3,241,034 | 3/1966 | Ludwig | 321—8 |
| 3,259,829 | 7/1966 | Feth | 320—1 X |
| 3,281,745 | 10/1966 | Moore et al. | 336—84 |

LEE T. HIX, *Primary Examiner.*

G. GOLDBERG, *Assistant Examiner.*

UNITED STATES PATENT OFFICE
CERTIFICATE OF CORRECTION

Patent No. 3,398,348 August 20, 1968

Lee A. Kilgore et al.

It is certified that error appears in the above identified patent and that said Letters Patent are hereby corrected as shown below:

Column 10, line 45, after "being" insert -- adapted for connection to the source of electrical energy. --.

Signed and sealed this 20th day of January 1970.

(SEAL)
Attest:

Edward M. Fletcher, Jr.
Attesting Officer

WILLIAM E. SCHUYLER, JI
Commissioner of Patent